(12) United States Patent
Fields

(10) Patent No.: US 7,710,279 B1
(45) Date of Patent: May 4, 2010

(54) SAFETY ALARM STEERING WHEEL SENSOR AND TIMER DEVICE FOR DRIVERS

(76) Inventor: Howard Gene Fields, 816 Branch Rd., Albany, GA (US) 31705

( * ) Notice: Subject to any disclaimer, the term of this patent is extended or adjusted under 35 U.S.C. 154(b) by 281 days.

(21) Appl. No.: 11/748,968

(22) Filed: May 15, 2007

Related U.S. Application Data

(60) Provisional application No. 60/747,296, filed on May 15, 2006.

(51) Int. Cl.
*G08B 23/00* (2006.01)
(52) U.S. Cl. .................. 340/575; 340/576; 340/309.16
(58) Field of Classification Search ................ 340/575, 340/576, 309.16, 573.1
See application file for complete search history.

(56) References Cited

U.S. PATENT DOCUMENTS

| | | | |
|---|---|---|---|
| 3,222,640 A | 12/1965 | Wurst | |
| 3,594,772 A | 7/1968 | Setser | |
| 3,585,626 A | 6/1971 | Tartarini | |
| 3,794,969 A | 2/1974 | Klopfenstein et al. | |
| 4,210,905 A * | 7/1980 | Coons | 340/575 |
| 4,540,979 A | 9/1985 | Gerger et al. | |
| 5,684,455 A * | 11/1997 | Williams et al. | 340/439 |
| 5,969,616 A | 10/1999 | Tschoi | |
| 6,087,943 A | 7/2000 | Bailey | |
| 6,946,965 B2 * | 9/2005 | Young et al. | 340/575 |

* cited by examiner

*Primary Examiner*—Jeffery Hofsass
(74) *Attorney, Agent, or Firm*—Brian D. Bellamy

(57) ABSTRACT

A safety alarm system for motor vehicle drivers is disclosed. The system is removable from a steering wheel and includes a control box system with power supply, switch, alarm and timer. The driver monitors the timer via a visual display. The timer repeatedly counts down until a time-out event occurs causing an alarm to activate. Removable and manually operated sensors are provided on the rim of a steering wheel that monitor tactile pressure or feedback from a driver. Upon receipt of driver feedback, the sensors send a reset signal to the timer and the timer renews its countdown. The safety alarm device is adaptable for installation on a steering wheel by a steering wheel cover configured for adaptation to a particular vehicle.

16 Claims, 4 Drawing Sheets

SAFETY ALARM STEERING WHEEL SENSOR AND TIMER DEVICE FOR DRIVERS

BACKGROUND OF THE INVENTION

The present invention relates to safety systems for drivers of vehicles and, more particularly, to a safety alarm system to alert drowsy drivers of a vehicle and assist vehicle drivers in remaining awake and alert by means of visual display and manually operated feedback system.

The problem of detecting sleepiness or drowsing in a driver of a motor vehicle has been prevalent since the development of automotive transportation. According to various studies, a need exists for a mechanical device to alert drivers who are drowsy to prevent them from falling asleep at the wheel. Such a mechanical alert device would be sufficient in many cases to prevent the worst case scenario of a driver falling into a complete state of sleep.

Various alarm devices have been designed and suggested to awaken a sleeping driver in order to prevent the large number of accidents that may be attributed to the drowsiness of a vehicle driver. However, such devices have not met with a high measure of success in the marketplace. This lack of success may be attributed to factors such as complexity and expense of the device installation or inconvenience to the vehicle driver.

A device is needed that is inexpensive, easy to install and retro-fittable to any vehicle. Further a device is needed that is attractive, convenient and easy to use. The device should also be optional by providing a switch that can be used by the driver to deactivate the device. Of course the switch should be capable of disablement when desirable. For instance the device should be capable of use by drivers convicted of driving under the influence of intoxicants (DUI) as a measure to guard against intoxication and lack of driver alertness. Such a device could be included a probationary measure as punishment and a deterrent to further DUI.

In this respect, the safety alert system of the present invention is designed to prevent falling asleep at the steering wheel of a motor vehicle and alert a driver of his or her drowsy condition. Also, the device is convenient but requires greater alertness of the driver by requiring active input from the driver. As well as a means for the driver to monitor his or her status. The present invention departs substantially from the conventional concepts and designs of the prior art, and in doing so provides an apparatus that increases safety in operating automobiles.

SUMMARY OF THE INVENTION

An object of the present invention is to provide a safe and effective means to prevent drivers from falling asleep at the wheel of a motor vehicle.

Another object of the invention is to provide a manually operated sensor for a motor vehicle driver to provide tactile feedback to a system that monitors a driver's compliance with maintaining contact or pressure on a steering wheel.

Another object of the invention is to provide a timing device that will alert a driver if tactile feedback is not provided to the system by a driver within a reasonable amount of time.

Another object of the invention is to provide a visual monitoring system for a driver to assist in maintaining driver alertness.

Another object of the invention is to provide a manually operated sensor for driver alertness that is easily removable and readily packaged for aftermarket installation.

Yet another object of the invention is to incorporate a visually monitor timing system and manually operated sensor device into a removable steering wheel cover with convenient control system.

DETAILED DESCRIPTION OF THE INVENTION

Figure 1:
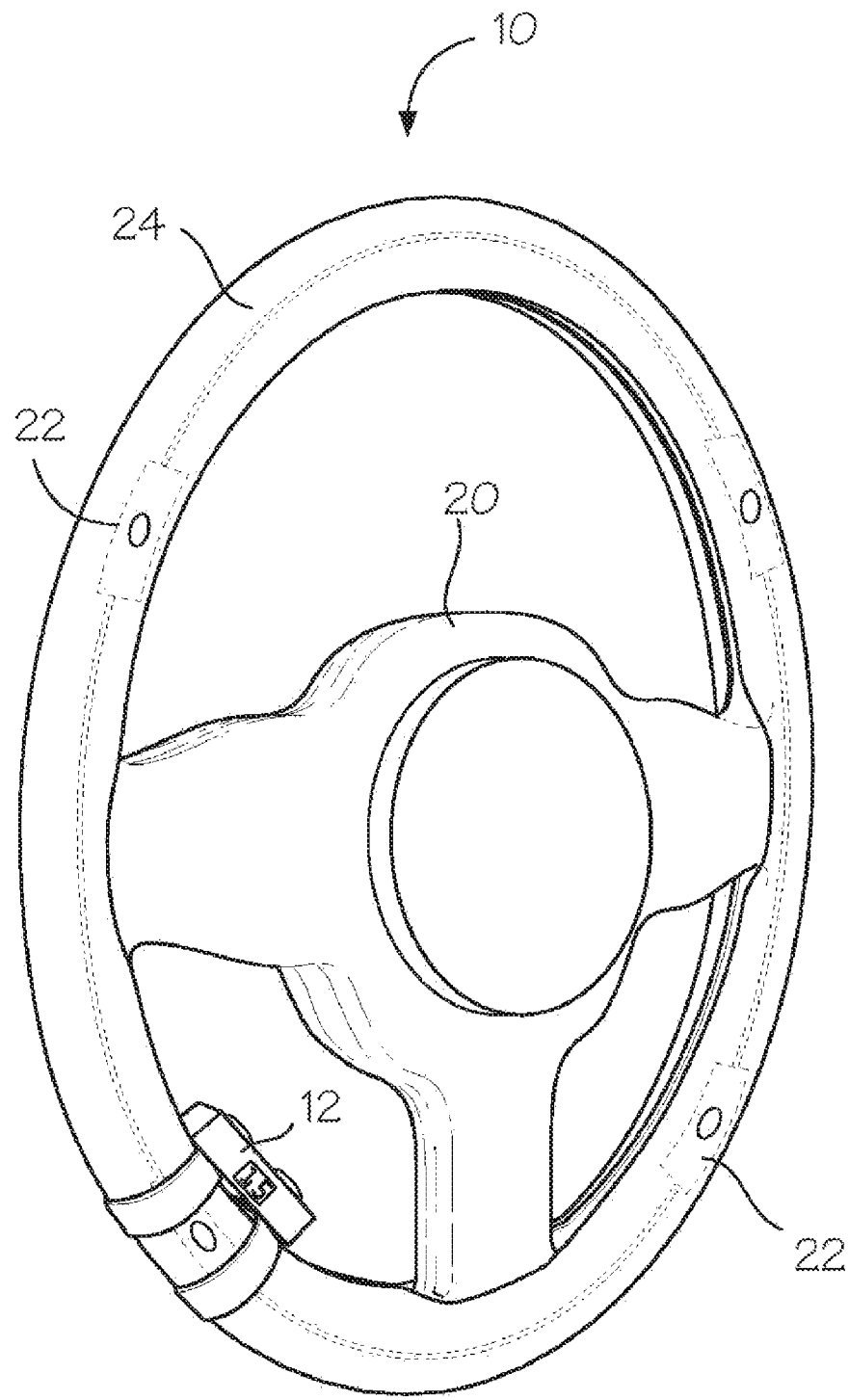
FIG. 1 is a perspective view of a steering wheel cover safety alarm system constructed in accordance with the present invention and having a plurality of manually operated sensors and visual monitoring system.
Figure 2:
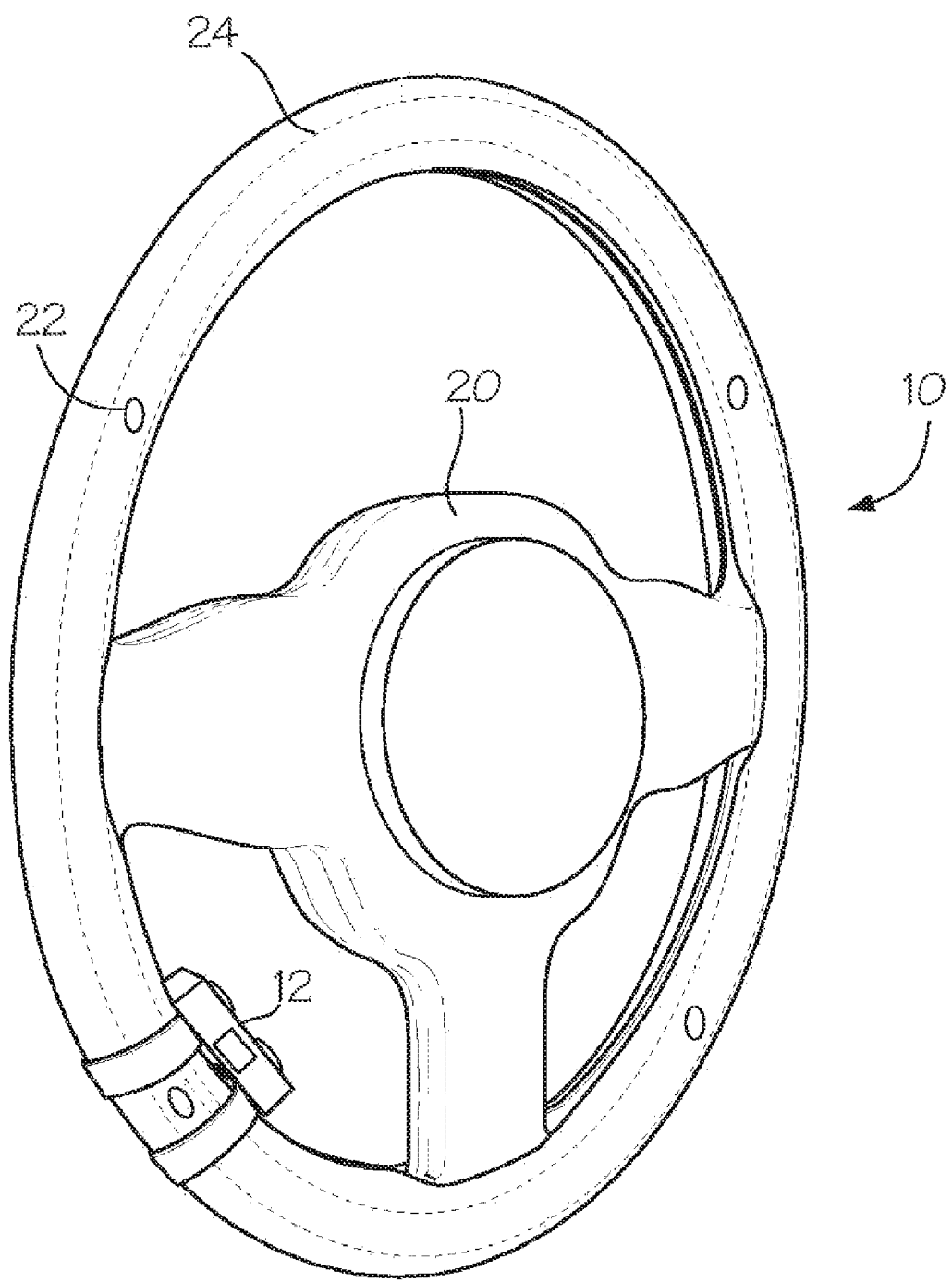
FIG. 2 is a perspective view of a steering wheel cover safety alarm system in accordance with the invention and having a unitary sensor about the circumference of the cover and visual monitoring system.
Figure 3:
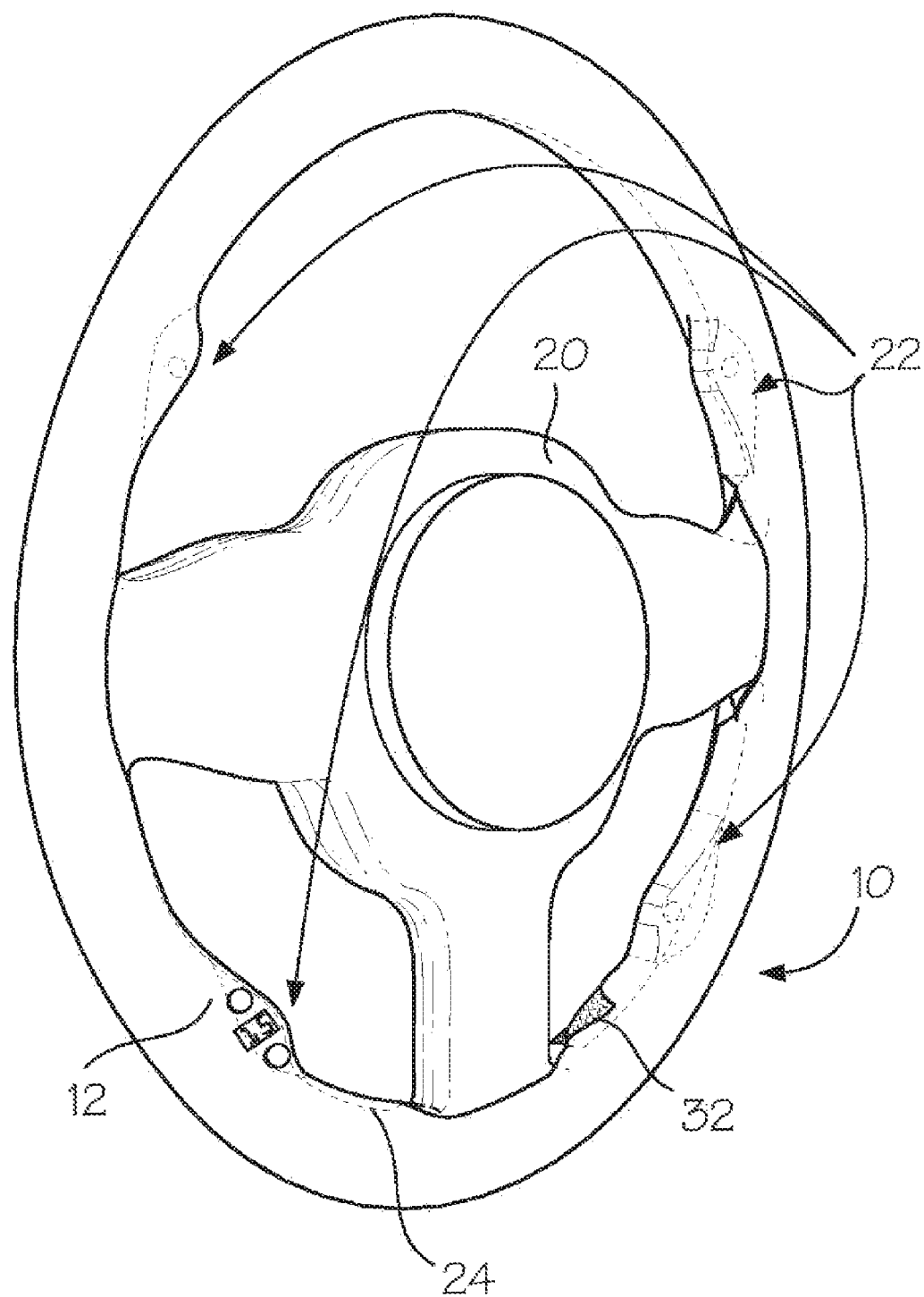
FIG. 3 is a perspective view of a steering wheel cover safety alarm system in accordance with the invention and having a plurality of manually operated sensors and hook and loop design of cover for attachment to a steering wheel.
Figure 4:
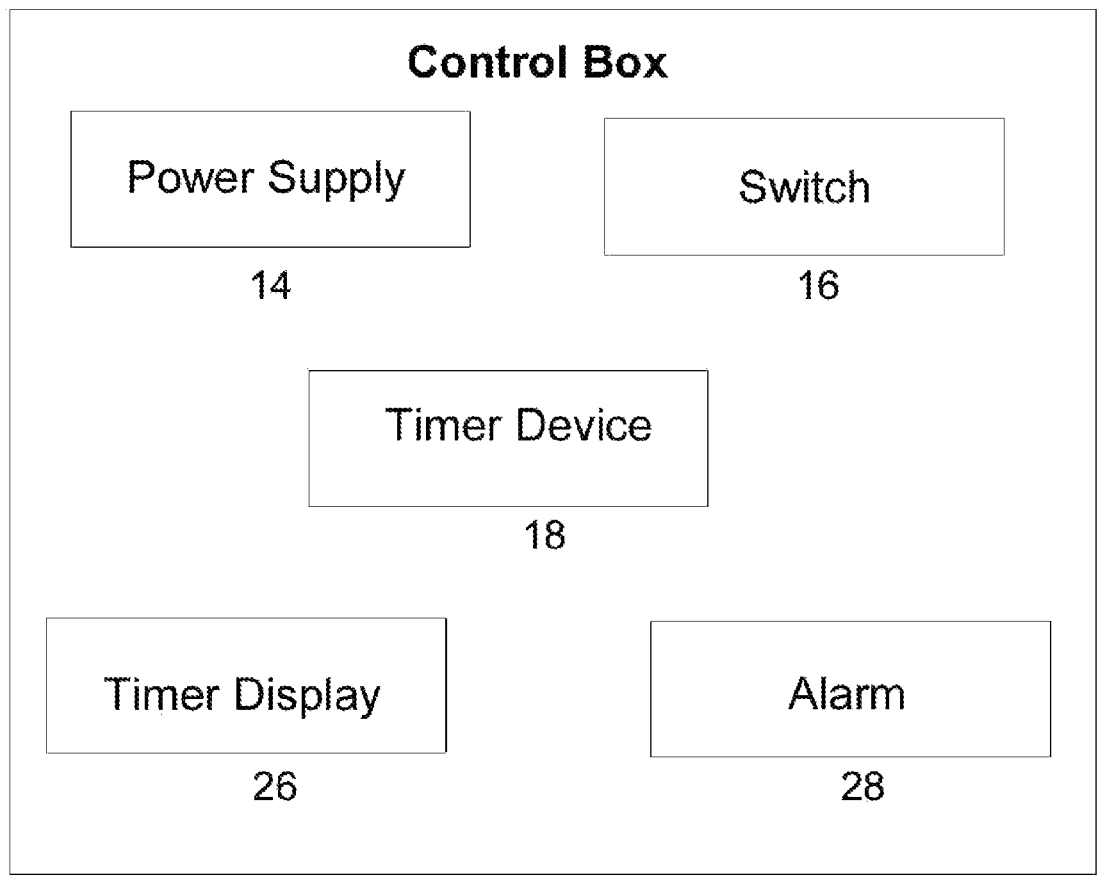
FIG. 4 is a block diagram view of a control box for the safety alarm system in accordance with the invention.

The invention provides a steering wheel mounted safety and alertness system. The system is removable and separable from the steering means and may be incorporated into a removable steering wheel cover 10 as shown in FIGS. 1-3. Such a steering wheel cover as provided may be sold as an aftermarket accessory in various sizes to improve the safety features of any motor vehicle.

The safety system includes a control box 12 that houses the required electronics for operation of the device. In particular, the control box may include a power source 14, and a switch 16 for enabling or disabling the device. In an alternative embodiment the switch may be secured for operation only by permission or removed for continuous activation of the safety system.

The control box 12 houses and includes a timing device 18 and other driver controls and displays. As illustrated, the control box is situated in a location on a steering wheel 20 where visual indicators can be easily identified and seen while driving so as not to interrupt or interfere with driving. The timing device includes circuitry that is integrated into the safety system and programmed to operate in combination with one or more sensing members 22 or manually operated pressure sensors that are also incorporated into the system and connected to the control box by suitable wiring 24 or wireless signal. The timing circuitry provides a continuous timing that resets and recycles upon receipt of a triggering input from the sensor(s) 22. A typical multi-purpose timer may be used, such as the ALTRONIX Model 6062.

In operation the sensors 22 comprise manually operated pressure monitors placed strategically within the included steering wheel cover 10 and about the rim of the steering wheel 20. When the device is installed, the sensors are placed where normal contact would be made by a driver with the steering wheel. In operation, a driver proceeds to conveniently operate a vehicle as usual, with one hand or two. As the driver continues, the driver manually asserts a force by occasional touching and squeezing on the included cover that will be detected by the sensors.

Each time the sensor receives such input, a signal is sent to the timing device 18 to reset the timing sequence. For instance, the timing device may be set to count for a set amount of time, for example 15 or 30 seconds. The set amount time may be configured to be user programmable according to preference. If within the allotted time of, for example, 30 seconds the timing device receives a signal, the count will begin over, and no alarm will go off. However, if within 30 seconds the timing device does not receive a signal, a time-out event will occur. The desirable countdown time of the timer before a time-out event may be variable and set by the control box according to preference or according to effectiveness. The driver monitors the status of the timer using a timer display 26.

The control box includes an alarm device 28 that is activated by the occurrence of a time-out event. The alarm may be of any desired type such as audible, tactile, or visual, but an audible sound may be standard and provides a sufficient alarm for alerting a drowsy or intoxicated driver in most cases. The audible alarm may even provide a spoken message to the driver such as a warning to "please stay alert."

Further feedback to the motor vehicle driver is provided by the timer display 26 as shown in FIGS. 1-3. The timer display includes a countdown of the time until a timeout event occurs, or the timer display could provide a periodic visual alarm or other notice. The display may also be programmed to provide a sequence of information such as countdown time, sensor signals per unit of time, or timeout events per unit of time.

As shown in FIGS. 2 and 3, the configuration of the sensors 22 may be varied. A configuration as shown in FIG. 2 with a solid unitary sensor about the entire circumference of the steering wheel may be ideal for typical drivers and conditions. This sensor will not require any particular positioning of the drivers hands and may provide the most signals to the timing device because of the variety of positions the drivers hands will provide sufficient pressure to cause a signal.

The configuration of FIG. 3 with several strategically mounted sensors may require more alert driving; for instance, the driver must periodically place his hands on the sensors or the alarm will activate. Thus, a driver using poor habits may cause the alarm to activate because he or she does not properly place his hands on the sensors. When the sensors are arranged as in FIG. 3, typical sensors will be about 3 inches in length and ½ inch wide. The sensors as shown are arranged in about the 10 o'clock, 2 o'clock, 5 o'clock, and 7 o'clock positions.

In any of the sensor configurations, the sensitivity of the sensors may also be programmed or arranged to play a role in the safety system and maintaining the alertness of the driver. For instance, a typical system may include very sensitive sensors 22 that only require slight manual touch or squeezing of the steering wheel by the driver to keep the alarm from activating. Such a system would be most appealing to the mass public that do not want any unnecessary interference from a safety system. This type system may provide an alarm only in a worst case scenario where a driver falls asleep and takes his or her hands completely off the steering wheel for the amount of time require to cause the alarm. In another example, the system may include sensors that require somewhat forceful squeezing and physical input from the driver. Thus, within each timing sequence, the driver will be required to physically squeeze the steering wheel at the location of the sensor. Failure to remain active in squeezing and monitoring the countdown timer will result in an alarm. The driver will monitor the visual timer display to ensure alertness. The driver will manually operate the sensor to reset the timer.

The invention is easily packaged within an aftermarket steering wheel cover product 10 that may be retrofitted to a variety of motor vehicles. As shown in FIG. 3, the cover may simply wrap around an existing steering wheel and attached by suitable attachment means, such as hook and loop fasteners 32. A commercially viable form of the product is envisioned that will streamline and unobtrusively incorporate the control box portion and the sensors into an aftermarket steering wheel cover. Further, it is recognized that the device and cover may be attractively designed with sports team indicia or desirable material, such as leather.

Various improvements may be incorporated into the control box feature of the invention. The power source may be battery based in order to prevent additional installation costs and to promote aftermarket sales of the invention. Further, the control box may include a remaining power indicator and operation status indicator to ensure proper functioning of the device without interruption.

I claim:

1. A safety alarm device for drivers comprising:
    a removable steering wheel cover for covering the rim of a vehicle steering wheel having a manually operated sensing member arranged on or within the cover along the rim of the vehicle steering wheel for receiving tactile input from drivers;
    a timing device that repetitively counts down a predetermined amount of time until the time elapses and a time-out event occurs or until the timing device is reset;
    a means for connecting the sensing member to the timing device for providing input from the sensing member to the timing device in which the input causes the timing device to reset; and
    a display for monitoring by the driver and an alarm incorporated into the removable steering wheel cover.

2. A method to improve driver safety and alertness comprising the steps of:
    providing a manually operated sensor a display and an alarm incorporated into a removable steering wheel cover for placement on a steering wheel rim;
    counting down from a specified countdown time;
    visually monitoring by the driver the status of the step of counting down from the specified countdown time;
    repeating the step of counting down from the specified countdown time by resetting the countdown time upon the driver manually operating the sensor;
    causing a time-out event and alarm if the driver does not manually operate the sensor before expiration of the countdown time.

3. A safety alarm device for drivers as in claim 1 in which the manually operated sensing member includes more than one pressure sensor arranged within the removable steering wheel cover.

4. A safety alarm device for drivers as in claim 1 in which the removable steering wheel cover includes a control box housing a power source, a switch, an alarm, the timing device and the display.

5. A safety alarm device for drivers as in claim 4 in which the power source is a battery.

6. A safety alarm device for drivers as in claim 4 in which the timing device is programmable using the control box.

7. A safety alarm device for drivers as in claim 1 in which the manually operated sensing member includes a solid unitary sensor about the steering wheel cover's entire circumference.

8. A method to improve driver safety and alertness as in claim 2 including a step of providing the steering wheel cover as an aftermarket steering wheel cover, and installing the steering wheel cover to a choice of an existing motor vehicle steering wheel by wrapping the steering wheel cover around the existing steering wheel.

9. A method to improve driver safety and alertness as in claim 2 including a step of displaying the countdown time on a display of a control box incorporated into the steering wheel cover.

10. A method to improve driver safety and alertness as in claim 9 including a step of setting the countdown time using the control box.

11. A method to improve driver safety and alertness as in claim 9 including a step of providing power to the control box and the manually operated sensor by a battery incorporated in the removable steering wheel cover.

12. A method to improve driver safety and alertness as in claim 2 in which the step of providing the manually operated sensor includes providing said steering wheel cover about an entire circumference of said steering wheel rim and providing a solid unitary sensor about the steering wheel cover's entire circumference.

13. A method to improve driver safety and alertness as in claim 12 in which the driver manually operates the sensor by periodically positioning the driver's hand anywhere about the steering wheel cover's circumference within the specified countdown time to avoid the step of causing a time-out event.

14. A method to improve driver safety and alertness as in claim 2 in which the step of providing the manually operated sensor includes providing said steering wheel cover about an entire circumference of said steering wheel rim and providing several sensors mounted in different locations about the steering wheel cover's circumference.

15. A method to improve driver safety and alertness as in claim 14 including the additional step of requiring the driver to manually operate the sensor by forcefully squeezing the steering wheel cover in the location of at least one of the sensors within the specified countdown time to avoid the step of causing a time-out event.

16. A method to improve driver safety and alertness as in claim 9 including the step of displaying sensor signals per unit of time and timeout events per unit of time on the display of the control box to inform the driver of alertness.

* * * * *